United States Patent
Takeda et al.

(10) Patent No.: US 6,809,934 B2
(45) Date of Patent: Oct. 26, 2004

(54) SUBMARINE BRANCHING UNIT

(75) Inventors: Taichi Takeda, Yokohama (JP); Junko Nishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 20 days.

(21) Appl. No.: 10/308,431

(22) Filed: Dec. 3, 2002

(65) Prior Publication Data
US 2003/0198027 A1 Oct. 23, 2003

(30) Foreign Application Priority Data
Apr. 23, 2002 (JP) ........................................ 2002-120784

(51) Int. Cl.[7] .............................. H05K 5/06; H05K 5/00
(52) U.S. Cl. ...................... 361/752; 174/50.5; 174/52.3
(58) Field of Search ................................. 361/730, 736, 361/752, 796; 174/50, 50.5, 50.51, 50.54, 52.1, 52.3; 257/678

(56) References Cited

U.S. PATENT DOCUMENTS 4,757,157 A * 7/1988 Pelet ........................... 174/50
6,290,399 B1 * 9/2001 Ogiya .......................... 385/53
653,712 A1 * 3/2003 Pitrone et al. ................. 174/70

* cited by examiner

Primary Examiner—David Martin
Assistant Examiner—Dameon E. Levi
(74) Attorney, Agent, or Firm—Katten Muchin Zavis Rosenman

(57) ABSTRACT

In a submarine branching unit which comprises in a pressure-tight cylinder, a circuit board, at least one circuit unit and plural vacuum relays each having terminals and wirings, the circuit unit is mounted on one side of the circuit board; the vacuum relays are mounted on the other side of the circuit board; and insulator covers accommodate the respective vacuum relays, terminals and wirings to insulate the vacuum relays from each other. The submarine branching unit further comprises a pair of cables extending out of a cover of the pressure-tight cylinder, which cables are each spiraled and engaged with each other in an interleaved and overlapped fashion.

8 Claims, 22 Drawing Sheets

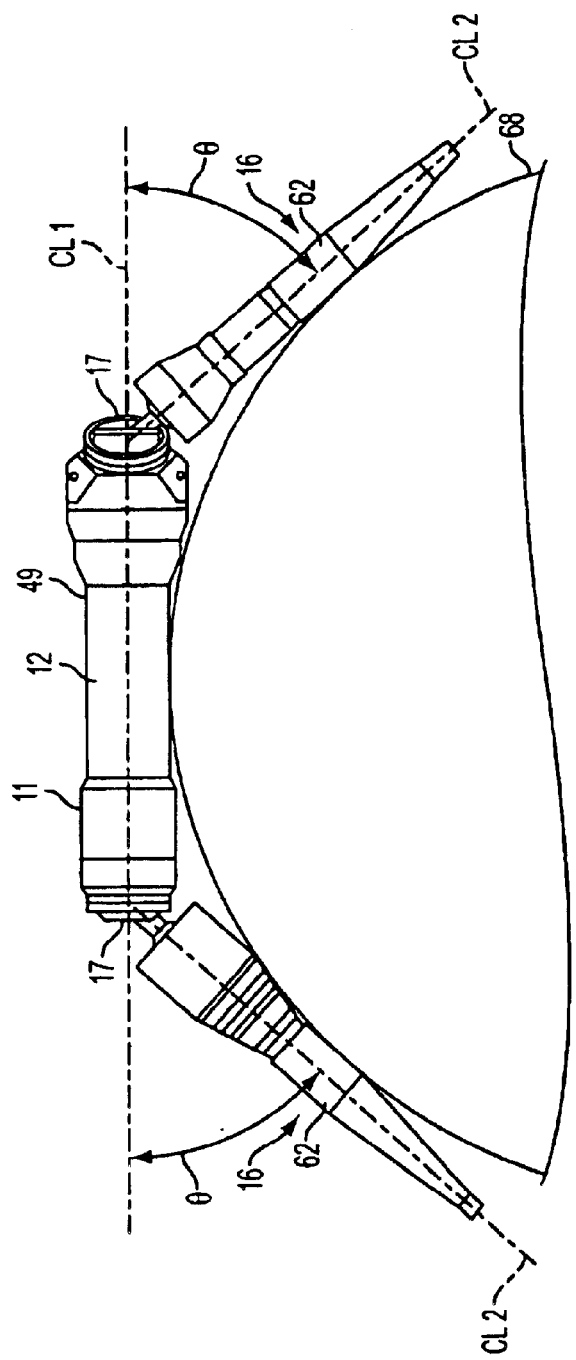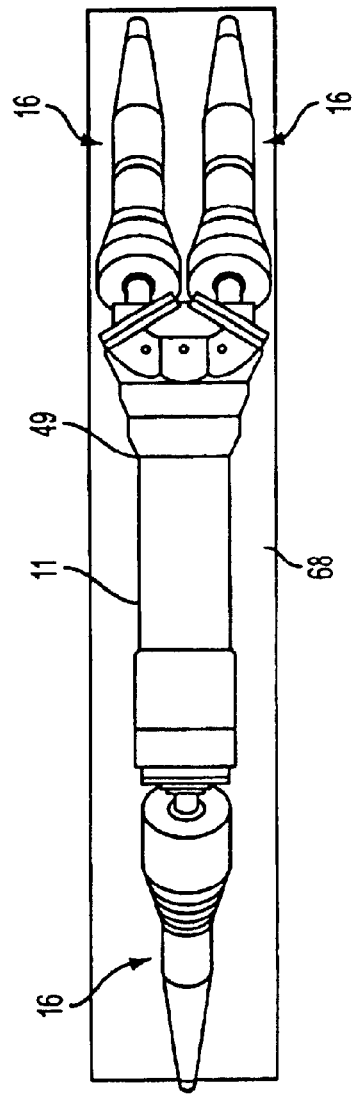
FIG. 21A
FIG. 21B

|  | CONVENTIONAL | PRESENT INVENTION | REMARKS |
|---|---|---|---|
| PRESSURE-TIGHT CYLINDER OUTSIDE DIAMETER | 400 mm Φ | 250 mm Φ | |
| GIMBAL JOINT DISTANCE | 1600 mm | 1400 mm | |
| WT — UNIT BODY | 8.5 KN | 3.5 KN | |
| WT — WITH CABLE TERMINATION | 10 KN | 5 KN | 50% REDUCED |
| WINDING ON 3M-DIAMETER SHEAVE | IMPOSSIBLE | POSSIBLE | |
| UNIT BODY SIZE | 300 mm Φ x 550 mm | 195 mm Φ x 540 mm | VOLUME 60% REDUCED |

FIG. 22

SUBMARINE BRANCHING UNIT

BACKGROUND OF THE INVENTION

1. Field of the Invention

The present invention relates to a submarine branching unit (herein after simply called branching unit) which branches a transmission line in two different directions in a communication system using the submarine cables, or more particularly to an improvement of the structure of the branching unit.

In order to further accelerate the development of information communication including the Internet via such submarine cables, it is in demand to shorten the time required to deliver communication equipment to customers after a contract has been made. In fact, submarine equipment such as a repeater has recently come to be manufactured within about half the period required several years ago To install or lay a repeater and a submarine cable underseas, a dedicated ship is used and therefore, development of the submarine equipment which is easy to install and lay in the sea is in demand.

There is a similar demand for a branching unit. Especially, a small-sized and light-weight branching unit which is easy to lay in and draw out of the sea and also easy to transport and store. Also, the demand arises since a dedicated strong cable is used with the branching unit and since a sheave having large a diameter as 3 meters is used with the cable.

2. Description of the Related Art

FIG. 1 shows an external appearance of a conventional branching unit with cable terminations. FIG. 2 is a sectional side view of the main body of the branching unit as shown in FIG. 1.

The branching unit 1 is composed of an inner unit 3, cable containers 4, a submarine cable 5, cable terminations 6 and gimbal joints 7. The inner unit 3 is accommodated in a pressure-tight cylinder 2. The cable containers 4 located at both ends of the pressure-tight cylinder 2, contain pigtail cables including an optical fiber for signal transmission and a feeder line for power supply. The cable terminations 6 connect the submarine cable 5 to the cables within the branching unit. The gimbal joint 7 bendably couples the cable containers 4 to the cable terminations 6.

As shown in the FIG. 3—side view, FIG. 4—top plan view and FIG. 5—bottom plan view, the inner unit 3 has vacuum relays 8 and circuit units 9-1 to 9-4 arranged respectively on top and bottom sides of the circuit board. The terminals (not shown in the figure) of the vacuum relays 8 project to the side of the vacuum relays 8. Also, feeder lines (not shown in the figure) connecting to the vacuum relay terminals and the respective circuits project in parallel with the vacuum relay terminals. Therefore, a space is required that is large enough to withstand 15 kilovolts across the terminals of adjacent vacuum relays 8 and accordingly, the vacuum relays 8 are mounted separately on both (upper and lower) sides of the circuit board. Four circuit units 9-1 to 9-4 are each mounted in a box case such that they are superposed on each other. Thus, the inner unit 3 is finished to an outside diameter (D) of 300 millimeters and a length (L) of 550 millimeters.

With the main body of the thus-constructed branching unit as shown in FIG. 2, the pressure-tight cylinder 2 has an outside diameter D1 of about 400 millimeters. The cable container 4 has an outside diameter D2 of about 480 millimeters. The main body has a length L1 of about 1600 millimeters and a weight of about 8 kilonewtons. The total length L2 of the branching unit as measured between the cable terminations 6 on both sides (see FIG. 1) is about 4500 millimeters.

With an ever increasing demand for the communication via the submarine cables, more and more communication capacity is required and accordingly, larger electric power and broader bandwidth are required. As a result, power consumption increases to about 150 watts, i.e., three times as large as the current 50 watts and it is required to increase the withstand voltage characteristics from the current 15 kilovolts to 18 kilovolts.

Accordingly, it is necessary to design a branching unit having improved withstand voltage and heat radiation characteristics, while minimizing the size of the unit. The conventional branching unit had following structural problems when laying/drawing out the unit in/from the sea.

First, since the branching unit is large in size, the unit does not wind well around a sheave whose diameter is about 3 meters and the laying/drawing work had to use a crane and a special rope and therefore, a such-equipped ship or work barge was necessary for that work.

The branching unit, which is about twice as heavy as a repeater, required a submarine cable which can tolerate a high tension applied to the unit in the deep sea. Therefore, a special cable had to be manufactured, taking into consideration the maintenance work after laid in the sea.

SUMMARY OF THE INVENTION

An object of the present invention is to provide a branching unit which has excellent withstand voltage and heat radiation characteristics and which is the same in size as a submarine repeater.

Another object of the present invention is to provide a branching unit which has the weight, the distance between gimbal joints on both sides and the outside diameter of the pressure-tight cylinder, reduced to those of a submarine repeater.

Throughout the above-mentioned drawings, identical reference numerals are used to designate the same or similar component parts.

To achieve the above and other objects, the present invention provides a branching unit including in a pressure-tight cylinder, a circuit board, at least one circuit unit mounted on the circuit board and a plurality of vacuum relays mounted on the circuit board and each having respective terminals and wirings. The circuit unit is mounted on one side of the circuit board. The vacuum relays are mounted on the other side of the circuit board. The vacuum relays are each accommodated in the insulator covers along with the respective terminals and wirings. Further, the present invention provides a branching unit including a pair of cables for carrying a signal and power, which cables are each spiraled and are engaged with each other in an interleaved and overlapped fashion on the outside of a cover of the pressure-tight cylinder.

BRIEF DESCRIPTION OF THE DRAWINGS

FIGS. 21A and 21B are explanatory views of the branching unit wound on the sheave.

FIG. 22 is a table comparing a conventional branching unit with that of the present invention.

DESCRIPTION OF THE PREFERRED EMBODIMENTS

Figure 1:
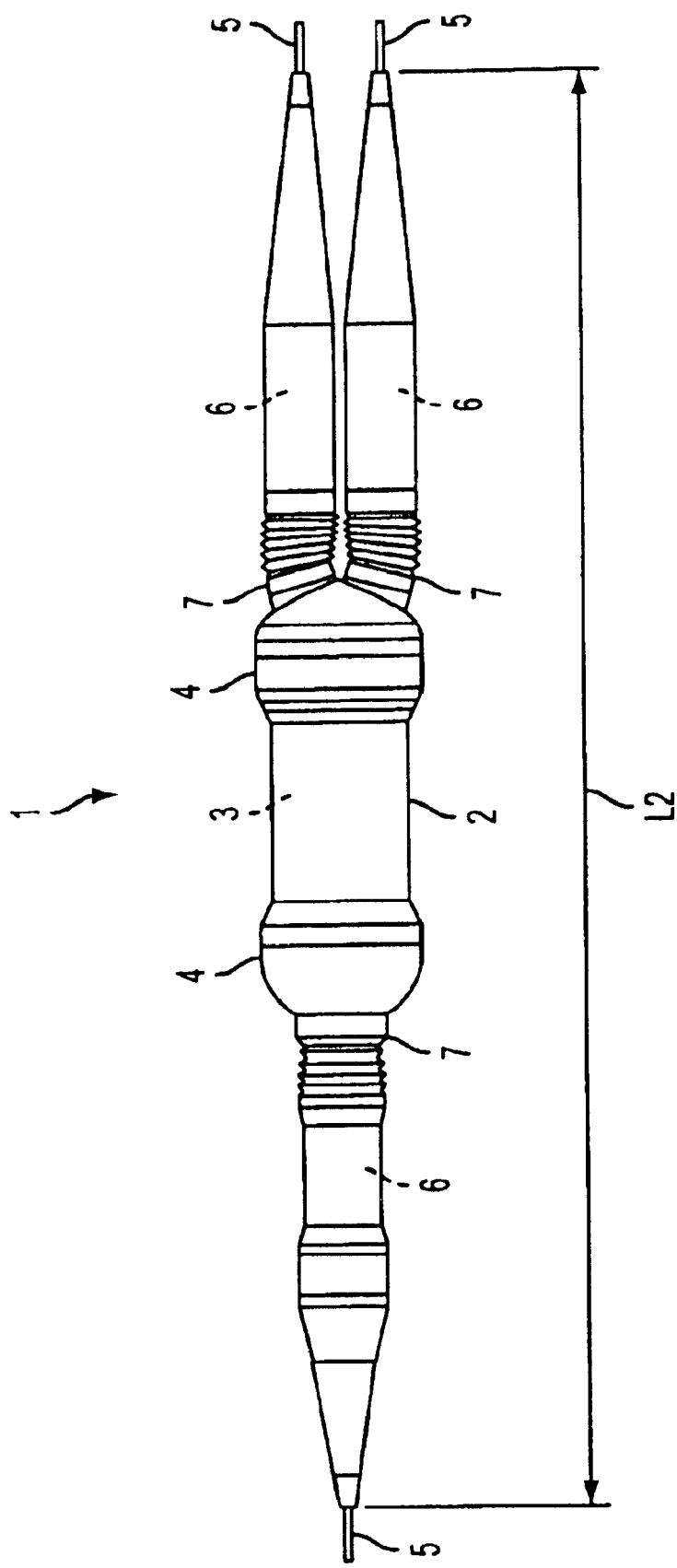
FIG. 1 shows an external appearance of a conventional branching unit.

Preferred embodiment of the present invention is explained, referring to the drawings. Throughout the above-mentioned drawings, identical reference numerals are used to designate the same or similar component parts. Moreover, the expressions "upper", "lower", "right" and "left" are not directed to the real unit, but to the figure for easy understanding.

Figure 6:
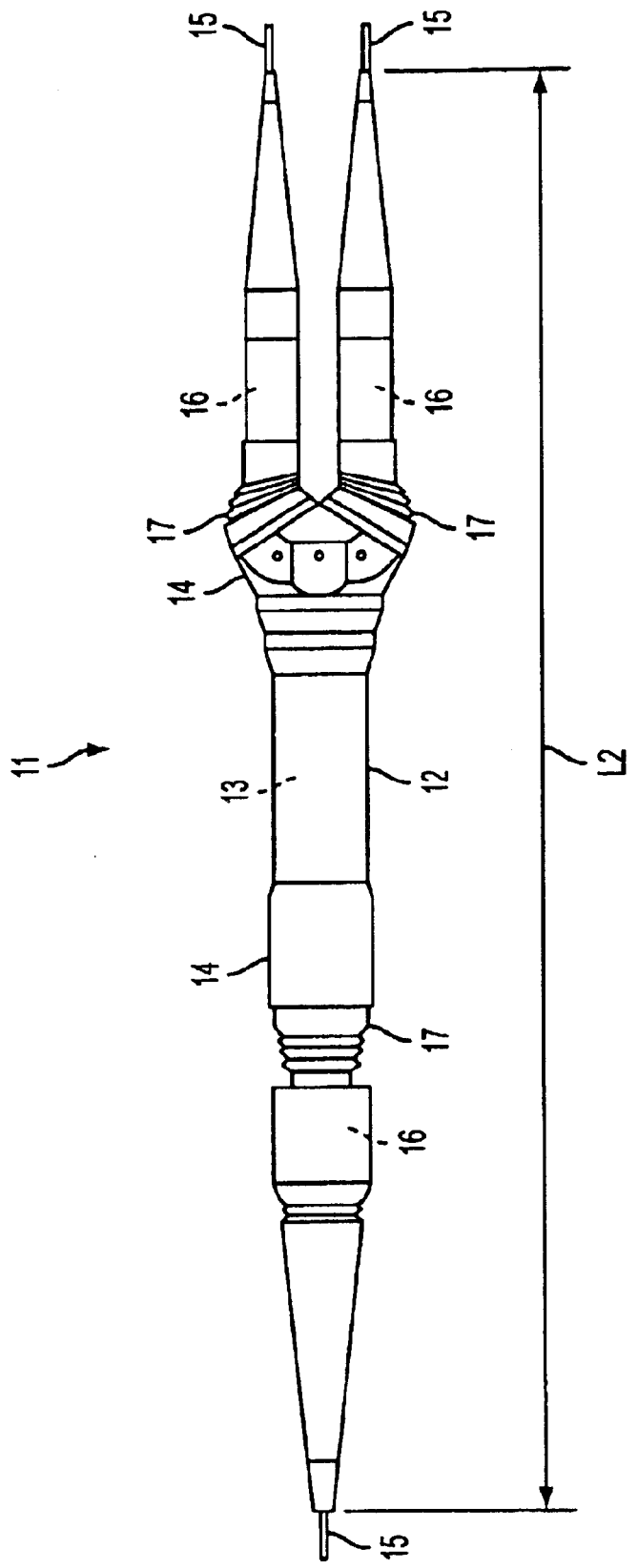
FIG. 6 shows an external appearance of the branching unit of the present invention.
Figure 7:
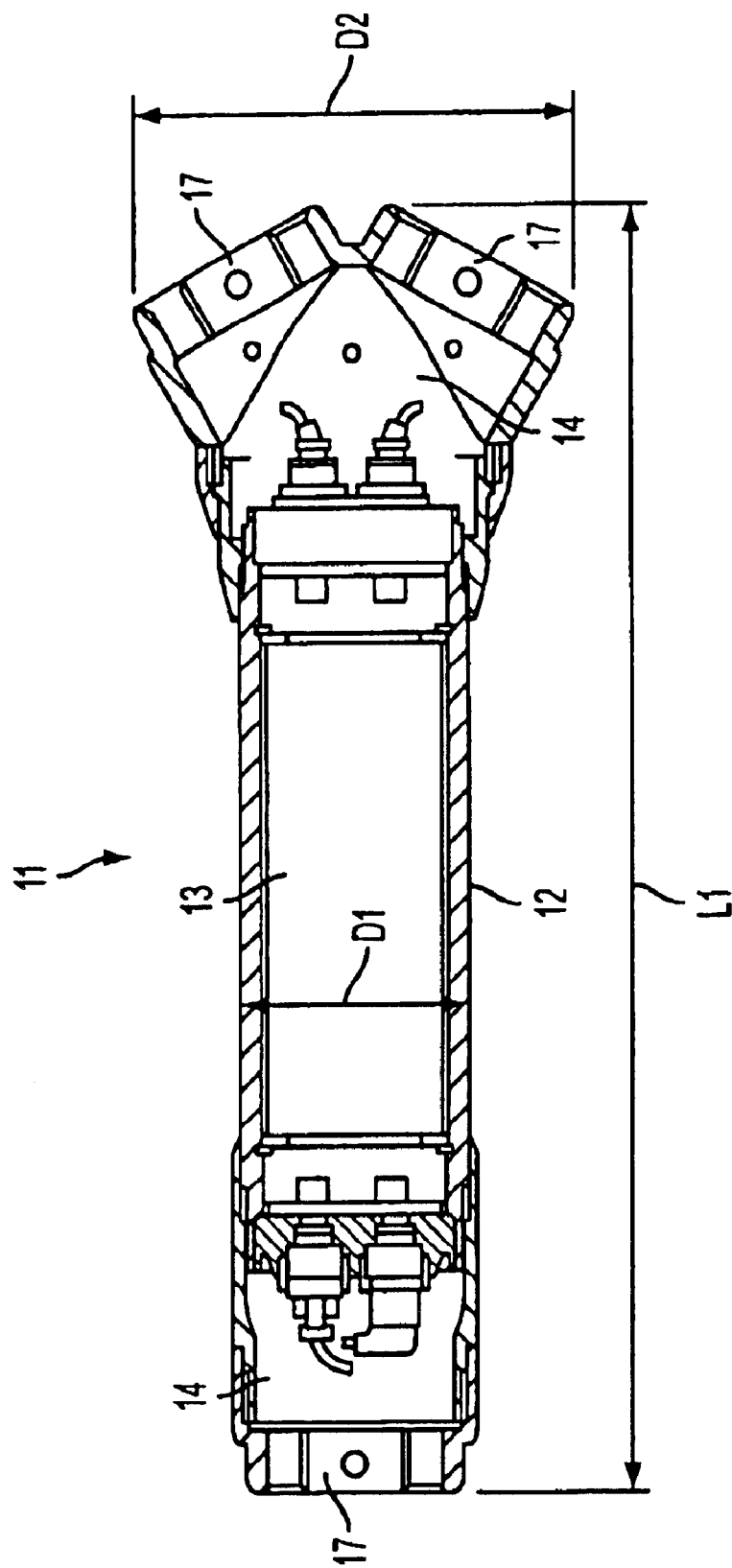
FIG. 7 is a sectional side view of the main body shown in FIG. 6.

FIG. 6 shows an external appearance of the branching unit of the present invention. FIG. 7 is a sectional side view of the main body shown in FIG. 6. The branching unit 11 is composed of an inner unit 13, cable containers 14, submarine cables 15, cable terminations 16 and gimbal joints 17. The inner unit 13 is contained in a pressure-tight cylinder 12. The cable containers 14 located at both ends of the pressure-tight cylinder 12, contain a pigtail cable consisting of an optical fiber for signal transmission and a feeder line for power supply. The cable terminations 16 connect the submarine cables 15 to the cables within the branching unit. The gimbal joint 17 bendably couples the cable containers 14 to the cable terminations 16.

Figure 8:
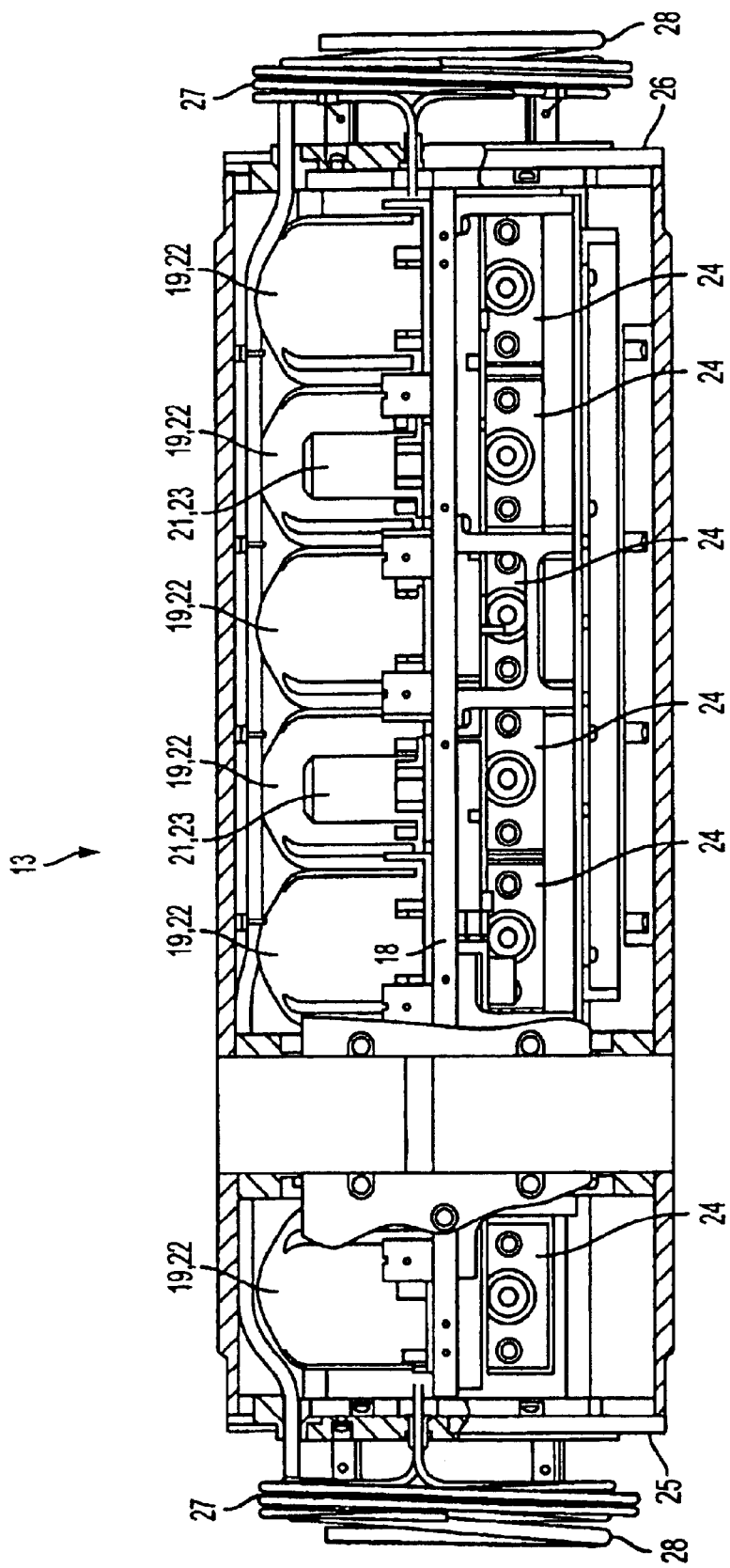
FIG. 8 is a side view of the inner unit.
Figure 9:
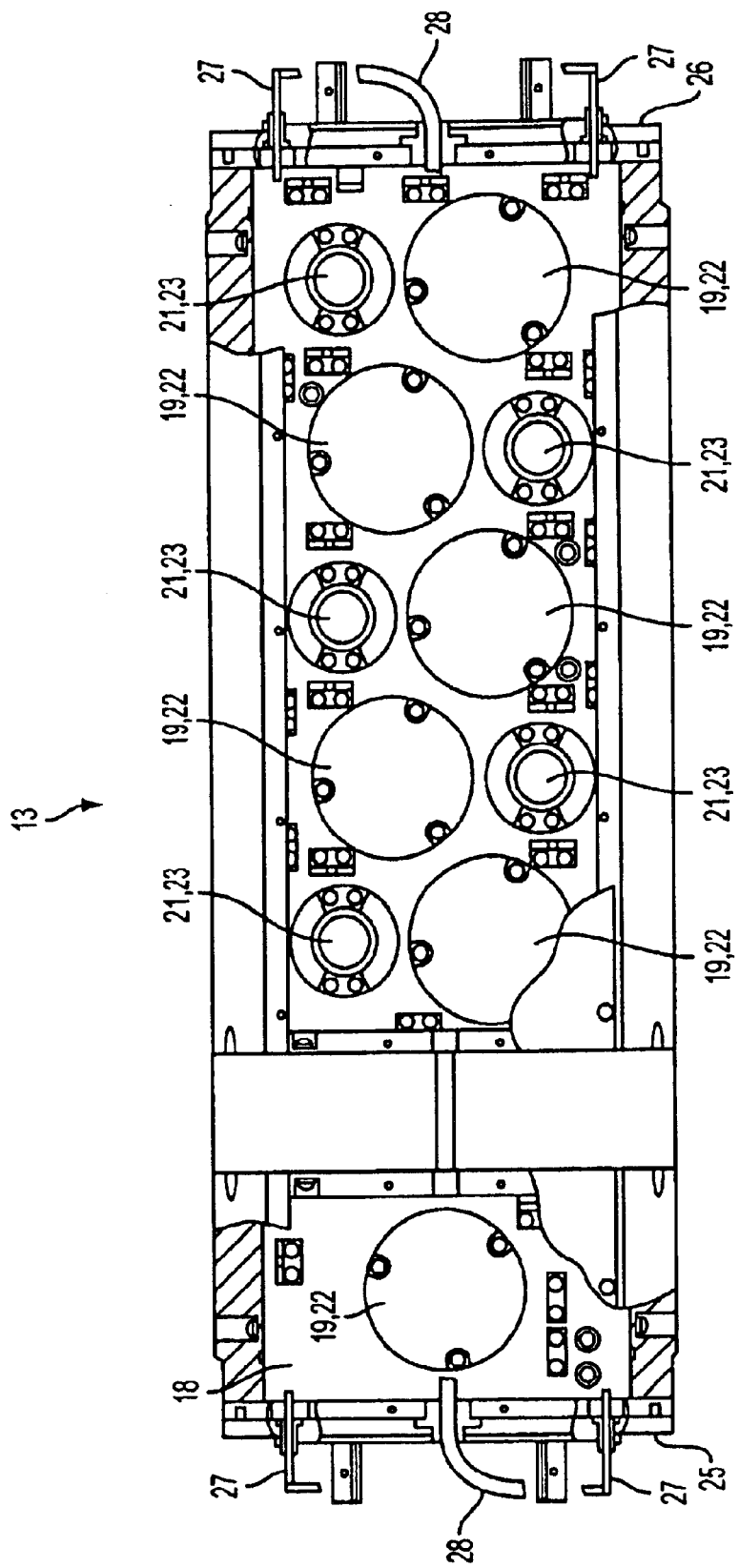
FIG. 9 is a top view of the inner unit.

As shown in FIG. 8—side view and FIG. 9—top view, the inner unit 13 has six vacuum relays 19 and five junction terminals 21 mounted on top of the circuit board; however, they are entirely covered with and obscured by insulator covers.

Figure 10:
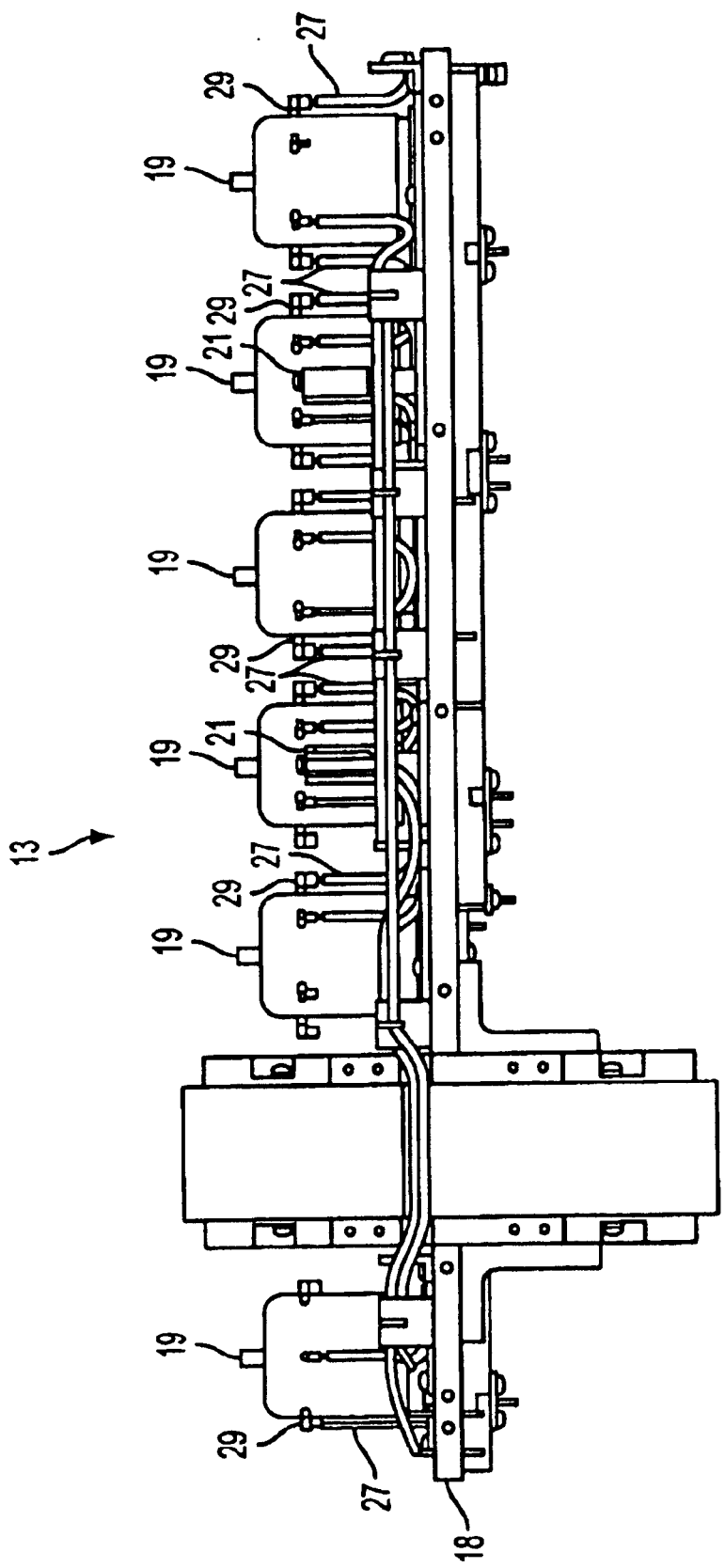
FIG. 10 shows the inner unit with the pressure-tight cylinder covers and insulator covers removed from that shown in FIG. 8.
Figure 11A:
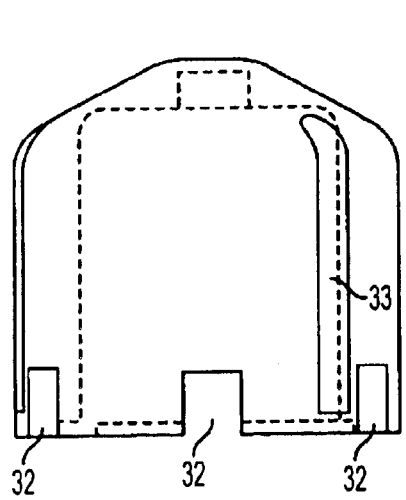
FIGS. 11A–11D show an insulator cover.
Figure 11B:
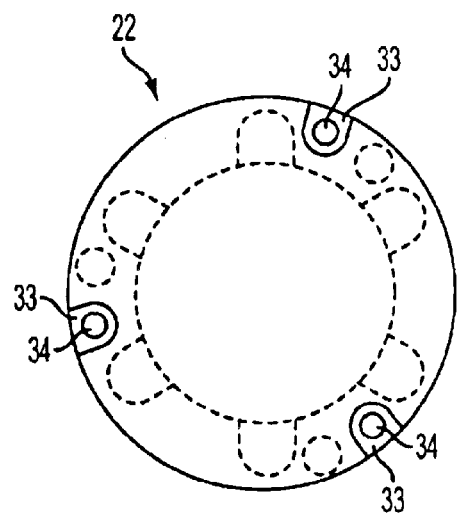
Figure 11C:
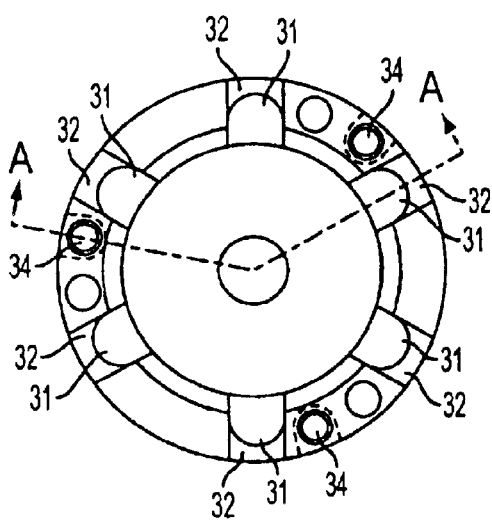
Figure 11D:
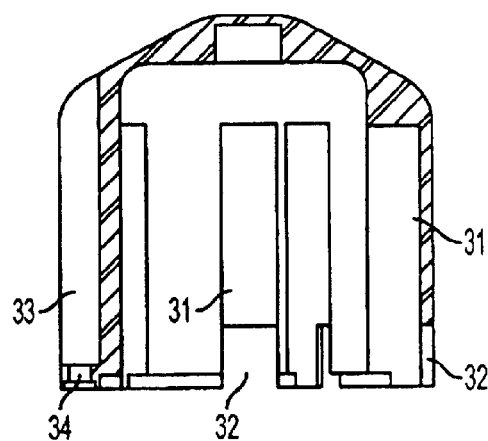

Circuit units 24 are mounted on the bottom side of the circuit board. On the outside of end plates 25, 26, an extra length of the feeder lines 27 and optical fiber cables 28 are held wound. FIG. 10, which shows the inner unit 13 with the end plates 25, 26 and the insulator covers 22, 23 removed from that shown in FIG. 8, illustrates the connection of the feeder lines 27 to vacuum relays 19 and relay terminals 21.

Terminals 29 stand erect around the vacuum relays 19 at a constant interval. The feeder lines 27 extend upward along the vacuum relays 19 and are connected with the top of the terminals 29 and are connected with the junction terminals 21 in the same way. The feeder lines 27 extend upward along the vacuum relays 19 and are connected with the top of the terminals 29 and the junction terminals.

An insulator cover 22 for covering the vacuum relay 19 are shown in FIGS. 11A–11D. FIGS. 11A–11D show a sectional side view, top view, bottom view an sectional side view taken on the line A—A in FIG. 11C, respectively of the insulator cover 22. The insulator cover 22 is made of e.g., polyethylene resin mold of excellent insulation property and shaped like a cylinder with an end closed. On the inside wall of the insulator cover 22, there are cut six vertical guide grooves 31 at an equal interval and notches 32 bored at each root of die guide grooves 31. Outside and around the insulator cover 22, there are carved three recesses 33 at an equal interval and fining holes 34 bored in the recesses 33.

Covering the vacuum relays 19 in the state as shown in FIG. 10 with the respective insulator covers 22 causes the terminals 29 and feeder lines 27 to be accommodated in the guide grooves 31. Then, inserting and screwing screws through the fitting holes 34 into the female threads cut on the circuit board 18 positions the feeder lines 27 in the notches 32 carved at the foot of the guide grooves 31 and connected as shown in FIGS. 8 and 9. Since the junction terminals 21 are also covered in the same way and vacuum relays 19 are kept insulated from each other, the distance between the adjacent vacuum relays 19 and also that between the junction terminals 21 of the adjacent vacuum relays 19 can be minimized. Even when more vacuum relays 19 are used as in the embodiment in order to increase the communication capacity, the present invention, along with the technique to fabricate the circuit unit 24 in large-scale integrated circuits, can reduce the size of the branching unit compared with the conventional one.

Figure 12B:
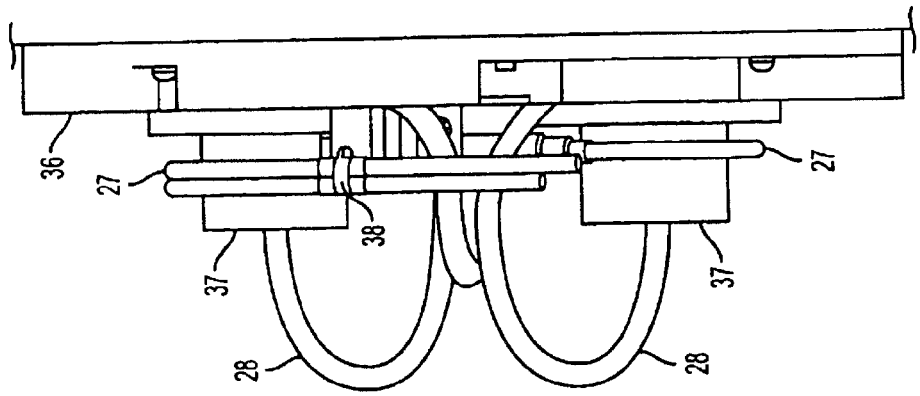
FIGS. 12A and 12B show the inside of the branch-side cover of the pressure-tight cylinder.
Figure 12A:
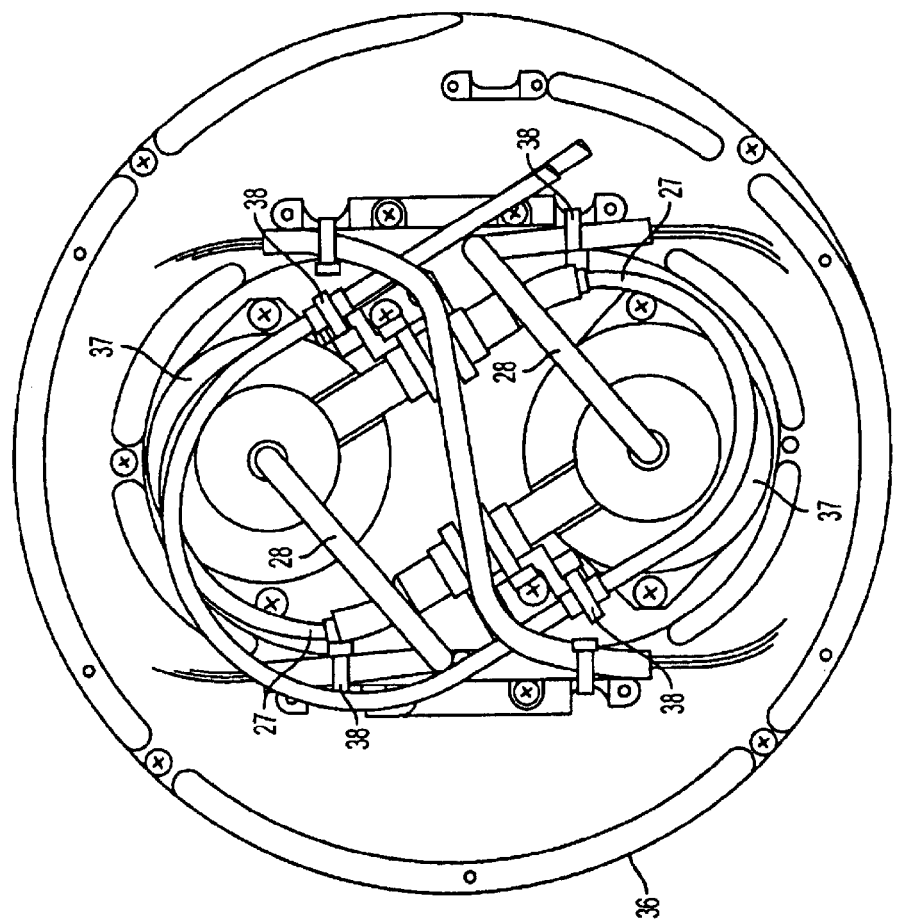
Figure 13:
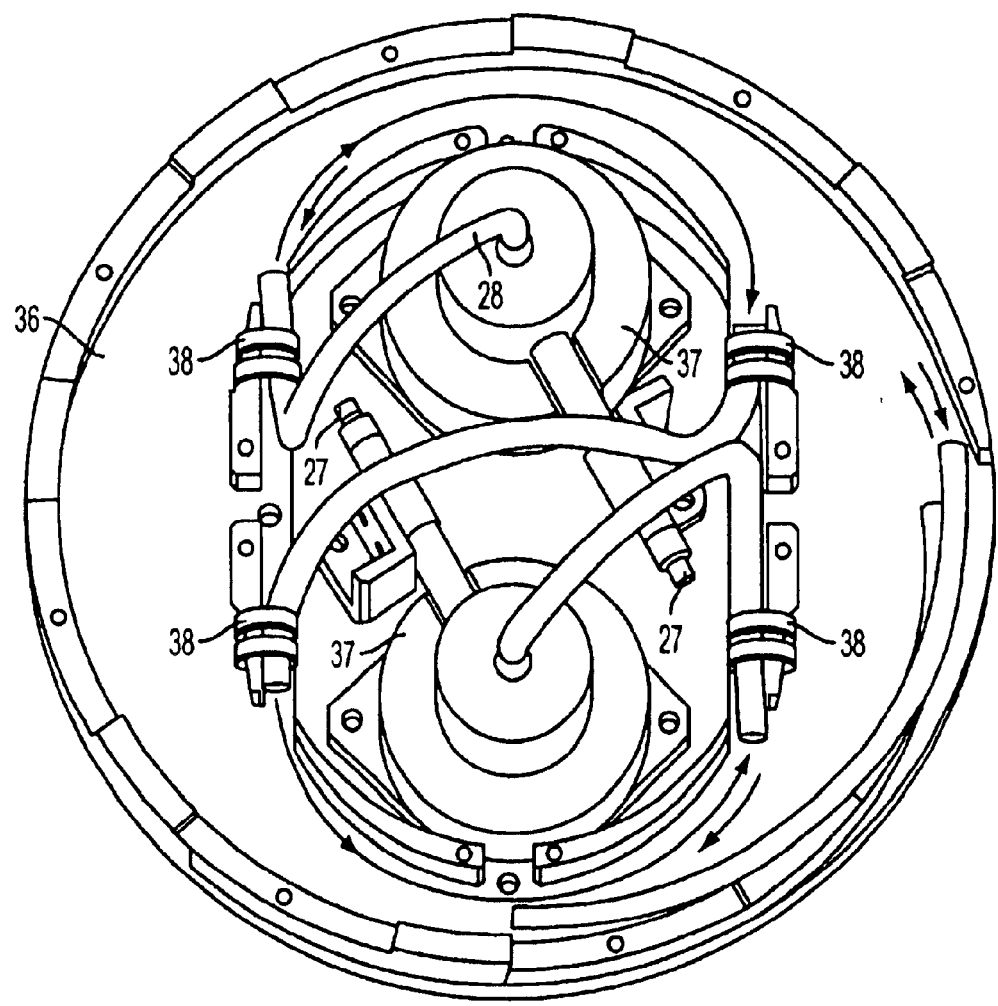
FIG. 13 is a perspective view of the pressure-tight cylinder shown in FIG. 12.

FIGS. 12A and 12B show schematic inside and side views respectively, of the cover 36 on the branch side of the pressure-tight cylinder 12, shown in FIG. 7. FIG. 13 is a perspective view thereof. Two cable feed-through assemblies 37 of the same construction are provided on the pressure-tight cylinder cover 36. As shown in the figures, an optical fiber cable 28 leading straight to the center of the cable feed-through assemblies 37 and a feeder line 27 leading sideways thereto are combined into a pigtail cable having a coaxial construction.

The cable feed-through assemblies 37 are constructed such that they are watertight even with the pigtail cable leading through they the pressure-tight cylinder cover 36 and endure against a high hydraulic pressure of the sea. As shown in the figures, the optical fiber cables 28 and feeder lines 27 are routed loosely inside of the pressure-tight cylinder cover 36 and fastened to the metal fittings by fastening bands 38. The above-mentioned optical fiber cables 28 and feeder lines 27 are connected to the corresponding internal ones explained by way of FIG. 8.

Figure 14:
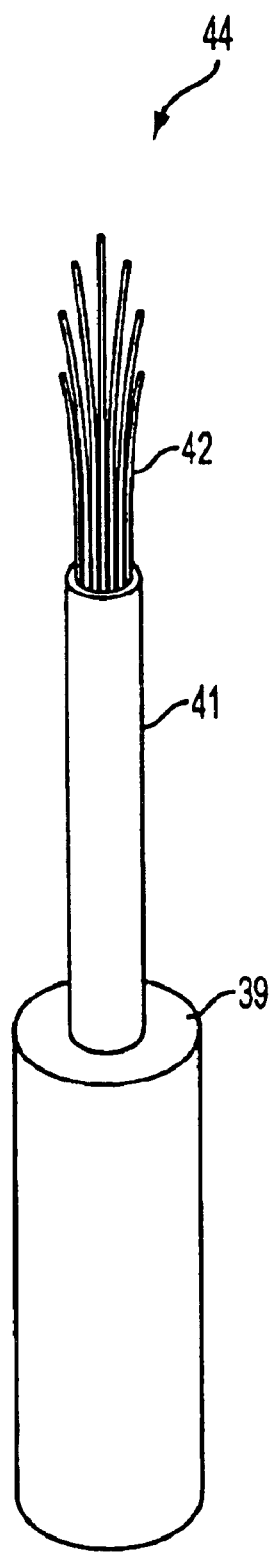
FIG. 14 is an explanatory view of the pigtail cable.

Referring to the FIG. 14, the pigtail cable 44 on the outside of the pressure-tight cylinder cover 36 is comprised of plural optical fiber lines 42, a water pressure-resistant copper-tube feeder pipe 41 for containing the fiber lines 42 and a polyethylene resin insulator coating layer 39 for coating the feeder pipe 41. The pigtail cable 44 is flexible enough to be formed in a spiral with a certain radius.

Figure 15C:
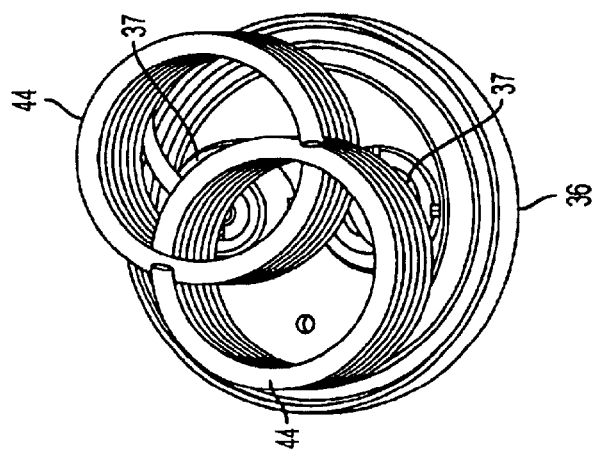
FIGS. 15A–15C show a process of assembling the outside pigtail cable (part 1).
Figure 15B:
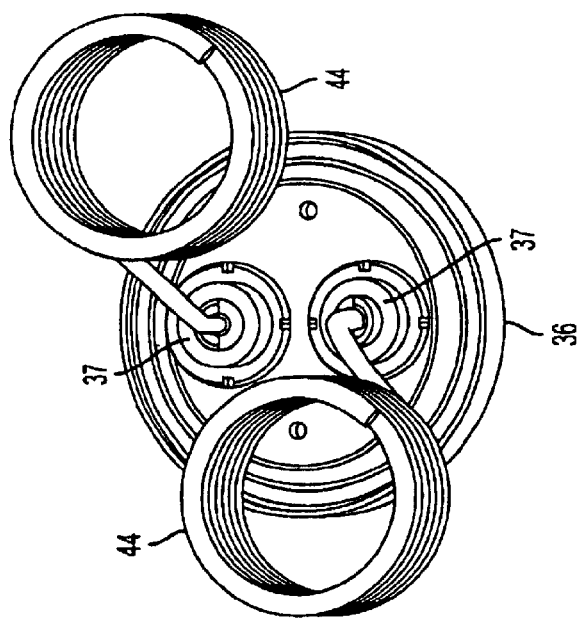
Figure 15A:
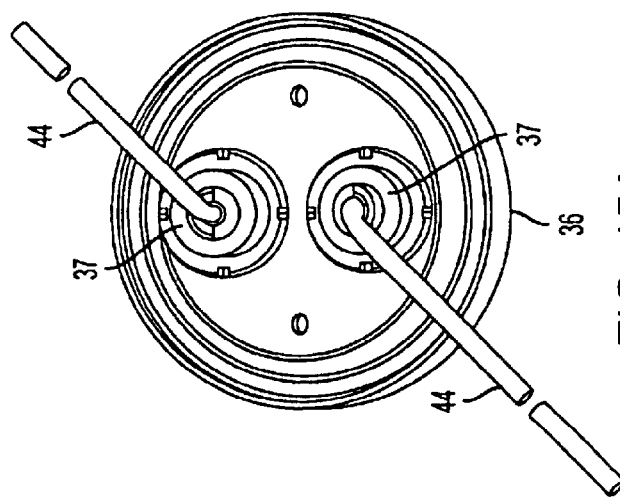

Next, a process of forming the pigtail cable 44 on the outside of the pressure-tight cylinder cover 36 is explained, referring to the perspective views of FIGS. 15A–15C. A pair of the pigtail cables 44 are each bent at the cable feed-through assemblies 37 in opposite directions as seen in FIG. 15A. Then, the pigtail cables 44 are spiraled (formed in a spiral) respectively, such that a cable segment does not touch other one but has some gap therebetween as seen in FIG. 15B. Finally, the spiraled pigtail cables 44 are engaged with each other in an interleaved and overlapped fashion, as seen in FIG. 15C. When the radius of the spiral is, e.g., 130 millimeters, the distance between the far ends of the spirals can be approx. 210 millimeters.

By using an appropriate tool, the spiral can be made in a correct circle. To engage the spirals with each other as in FIG. 15C, it is desirable not to bend the cables too extremely but to bend smoothly by using a bending tool. Instead of spiraling the cable in the same direction as in FIG. 15C, the cable may be spiraled in opposite directions, thus further minimizing the distance between the axes of the spirals.

Figure 16B:
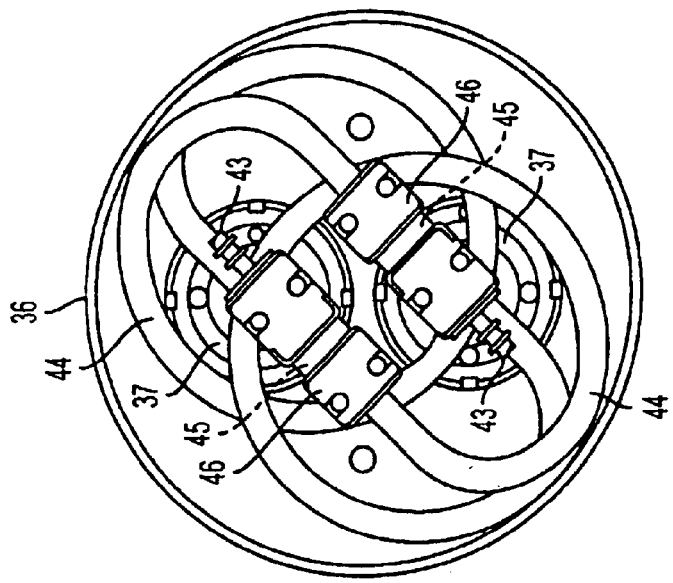
FIGS. 16A and 16B show a process of assembling the outside pigtail cable (part 2).
Figure 16A:
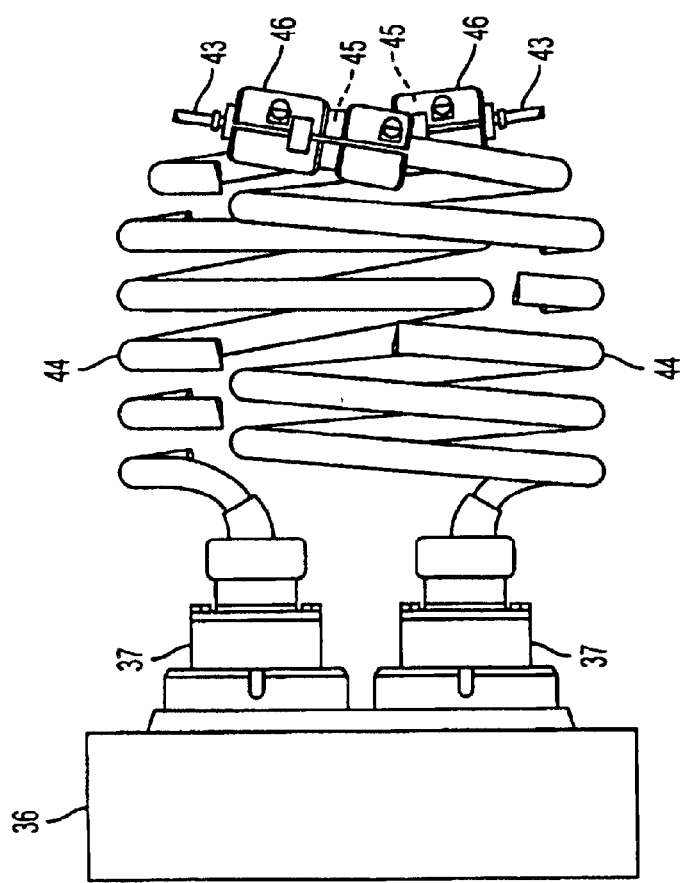

Terminal fittings 45 for connecting the thus-spiraled and engaged pigtail cables 44 to the submarine cables, are attached to the tip of the feeder pipe 41 and kept covered with a cover 46 until the pigtail cable 44 is actually connected to the submarine cable, as shown in FIGS. 16A and 16B. A required length of the optical fiber line 42 is extended from the cover 46 along with the polyethylene-resin tube 43.

Figure 17B:
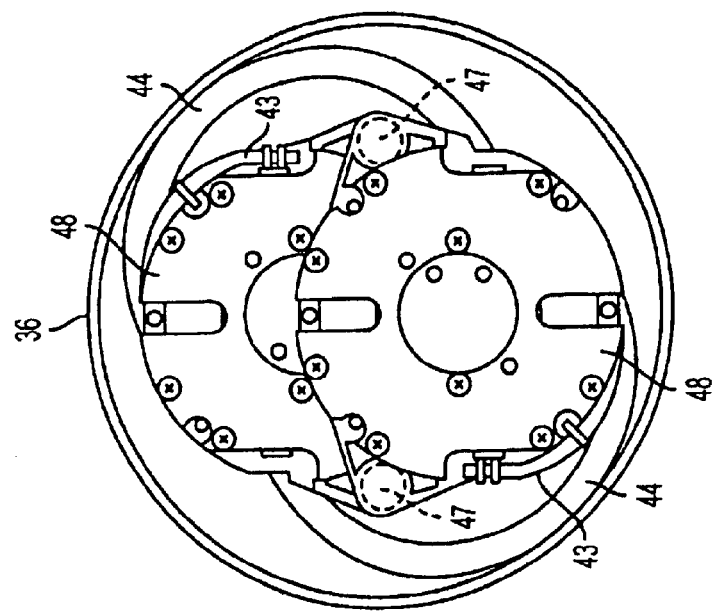
FIGS. 17A and 17B show a process of assembling the outside pigtail cable (part 3).
Figure 17A:
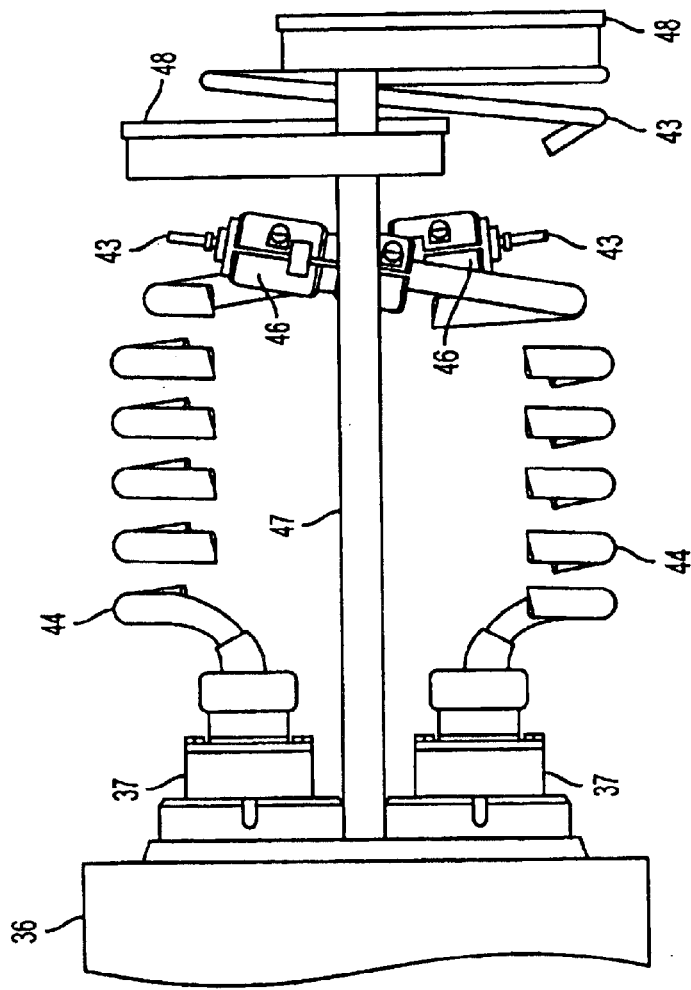
Figure 18:
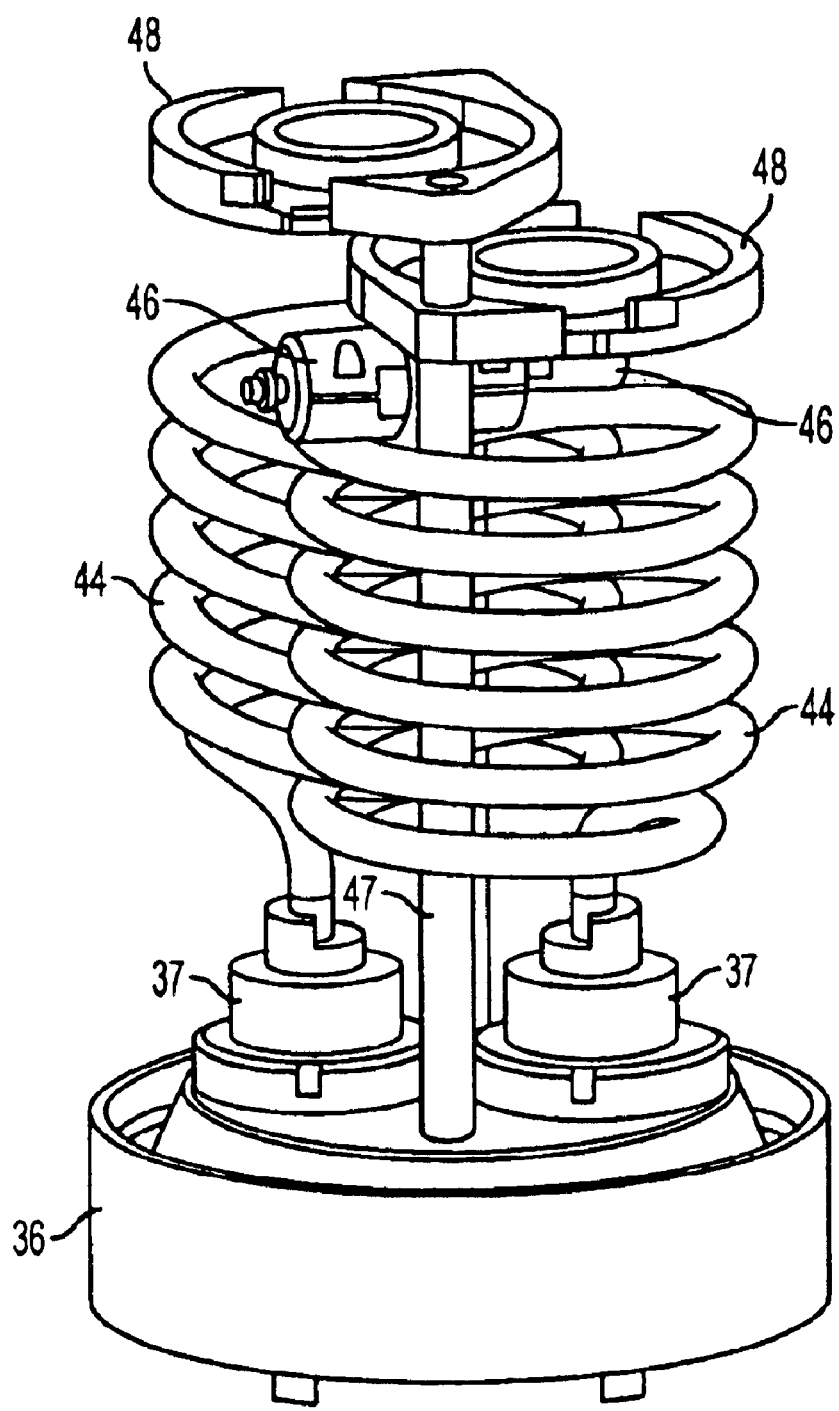
FIG. 18 is a perspective view of the pigtail cable shown in FIG. 17.

As shown in FIG. 17A—side view, FIG. 17B—front view and FIG. 18—perspective view, two props 47 with a ring cap attached on the tip, are erected on the pressure-tight cylinder cover. The optical fiber line 42 and polyethylene-resin tube 43 are wound and housed in the cap 48. This provision prevents the pigtail cable 44 from deforming and moving and maintains the cable stable in a correct position in a factory manufacturing process. Also, the provision prevents the pigtail cable 44 when coupled to the pressure-tight cylinder 12, from touching other components, since the distance between the far ends of the spiraled pigtail cable pair can be smaller than the diameter of the pressure-tight cylinder cover 36.

The thus-constructed pressure-tight cylinder cover 36 is engaged and welded with the end of the cylinder portion constituting the pressure-tight cylinder 12 to form an airtight (watertight) one-piece construction. Since the same is true with the pressure-tight cylinder cover 35 on the trunk side except for having only one pigtail cable, figures and explanations are omitted.

Figure 19:
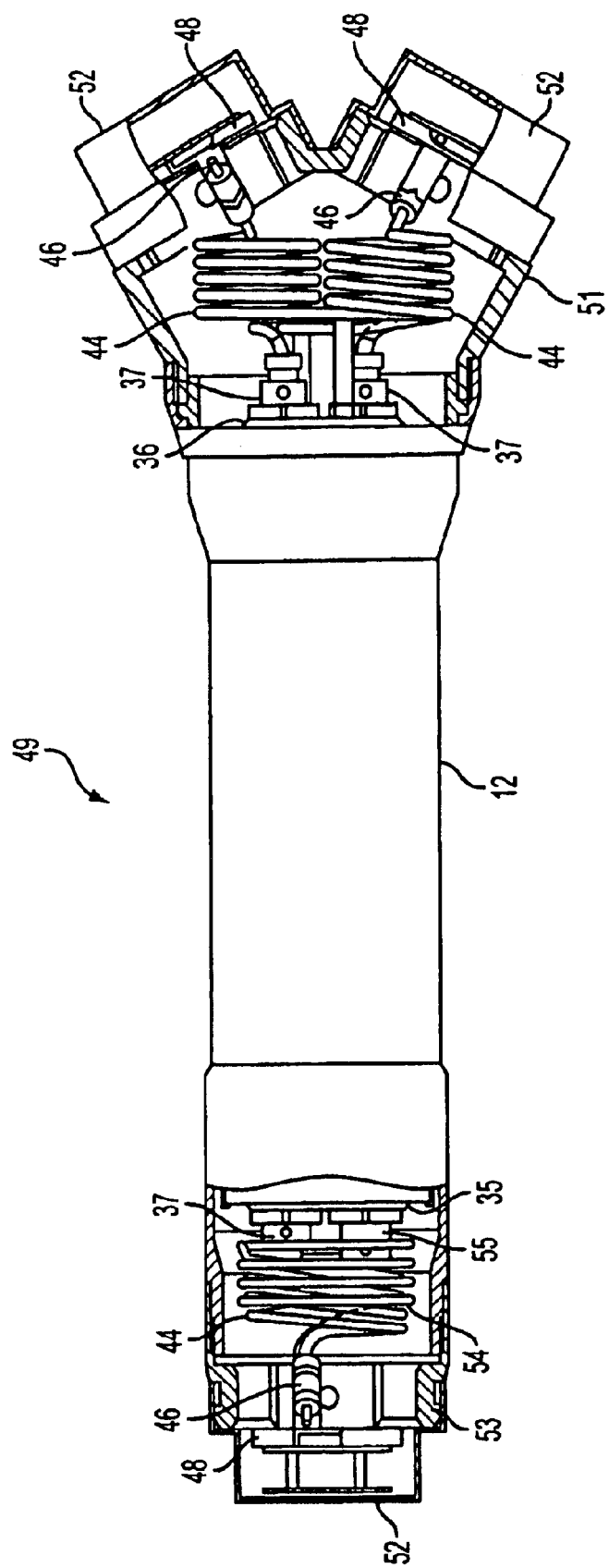
FIG. 19 is a partially sectional side view of the branching unit.

FIG. 19 is a side sectional view of the thus-assembled branching unit body 49. A branching joint ring 51 is provided on the branch side (figure right) of the branching unit body 49. One ends of the spiraled pigtail cables 44 are engaged with each other on the pressure-tight cylinder cover 36 side. Meanwhile, the other ends are disengaged and introduced to the respective openings of the branching joint rings 51 with the props 47 (described via FIG. 18) removed. Each of the other cable ends is covered with a cover 46 having a terminal metal. The cover 46 and a cap 48 at the tip are secured by the protection cap 52 which covers the opening of the branching joint ring 51.

There is provided a main joint ring 53 on the trunk side (figure left). The pigtail cable 44 extending from the cable feed-through assembly 37 of the pressure-tight cylinder cover 36 is spiraled and is secured along with the cap 48 at the tip by the protection cap 52 covering the opening of the main joint ring 53. Further, an earth cable 54 for supplying the sea earth to the power supply circuit which in turn supplies power to the feeder line 27, extends from the cable feed-through assembly 55 provided on the pressure-tight cylinder cover 36.

Figure 20:
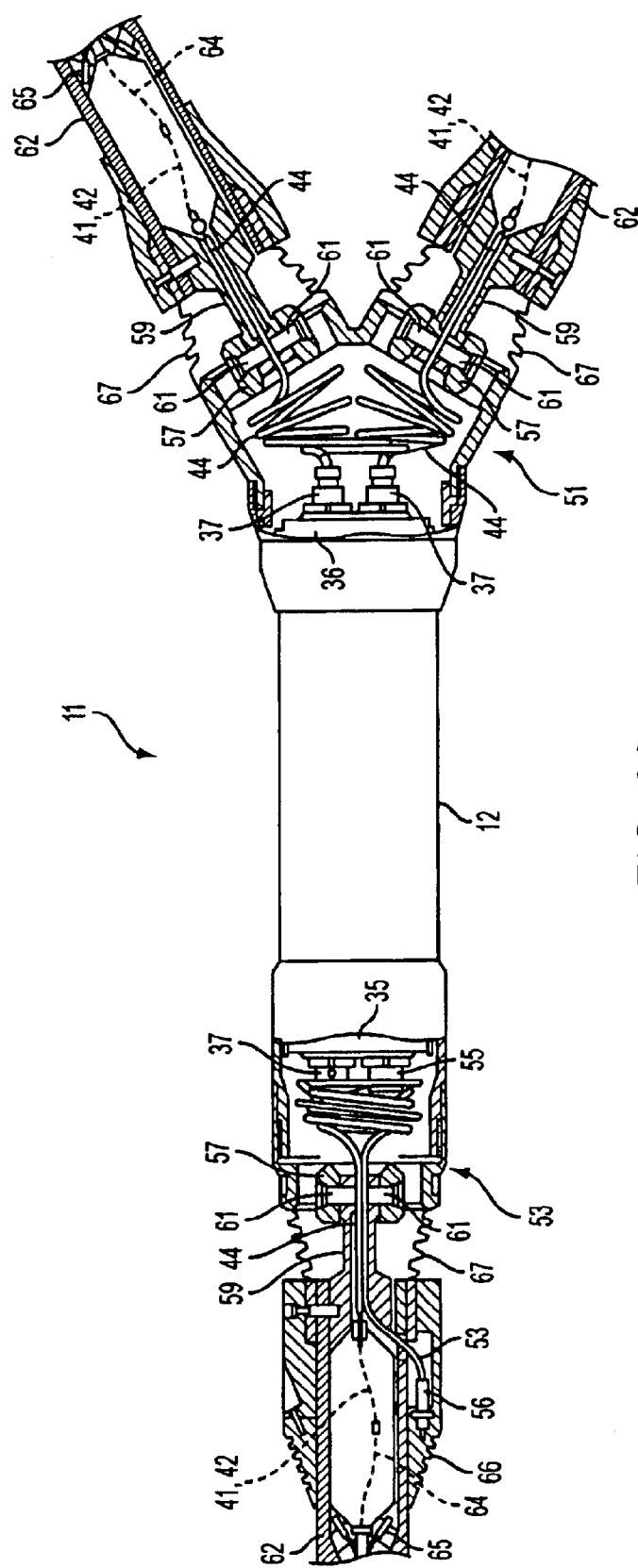
FIG. 20 is a partially sectional side view of the branching unit with a submarine cable connected.

FIG. 19 is a partially sectional side view of the branching unit 11 in a state before actually connected with the submarine cables. FIG. 20 is a partially sectional side view of the branching unit 11 connected with the submarine cable 15. For easy understanding, the same reference numerals are used to designate the same or similar components on the branch and trunk sides.

On the branch side, a joint ring 57 is disposed in each of the two openings of the branching joint ring 51. Two joint pins 58 (not shown in the figure) are inserted into the joint ring 57 through the opening of the branching joint ring 51 respectively, from downward to upward and vice versa with respect to the drawing, to allow the joint ring 57 to rotate in parallel with the drawing. An axis 59 is inserted in the center of the joint ring 57. Two joint pins 61 are inserted into the axis 59 through the joint ring 57 respectively, from left to right and vice versa with respect to the drawing, to allow the axis 59 to rotate vertically to the drawing. Thus, so-called a gimbal joint 17 is constructed which allows the axis 59 to tilt in any directions at the opening of the branching joint ring 51, such that the axis 59 rotates on a conic surface, with the point at which the axis of the joint pins 58 intersects with that of the joint pins 61 as the axis of rotation.

A cylindrical coupling resin (resin with glass fiber mixed) 62 connected with the submarine cable 15, is coupled with the tip of the axis 59. The optical fiber lines 42 and feeder pipe 41 of pigtail cable 44 coming through the axis 59, are connected, as shown by the dotted line, with the corresponding optical fiber lines 64 and feeder pipe 63 (not shown in the figure) of the submarine cable 15 and then, maintained airtight (watertight). To connect the corresponding optical fiber lines and feeder lines within the coupling resin 62 in this way, the pigtail cable 44 spiraled within the branching joint ring 51 is partially extended and drawn into the axis 59. The part having a reference numeral 65 provided at the tip of the coupling resin 62 is a terminal for detaining the high-tensile steel line of the submarine cable 15.

On the trunk side, a joint ring 57 is disposed in the opening of the main joint ring 53. Two joint pins 58 (not shown in the figure) are inserted into the joint ring 57 through the opening of the main joint ring 53 respectively, from downward to upward and vice versa with respect to the drawing, to allow the joint ring 57 to rotate in parallel with the drawing. An axis 59 is inserted in the center of the joint ring 57. Two joint pins 61 are each inserted into the axis 59 through the joint ring 57 respectively, from left to right and vice versa with respect to the drawing, to allow the axis 59 to rotate vertically to the drawing. Thus, so-called a gimbal joint 17 is constructed which allows the axis 59 to tilt in any directions at the opening of the main joint ring 53, such that the axis 59 rotates on a conic surface, with the point at which the axis of the joint pins 58 intersects with that of the joint pins 61 as the axis of rotation.

On the trunk side, too, a cylindrical coupling resin 62 connected with the submarine cable 15, is coupled with the tip of the axis 59. The optical fiber lines 42 and feeder pipe 41 of pigtail cable 44 coming through the center of the axis 59, are connected, as shown by the dotted line, with the corresponding optical fiber lines 64 and feeder pipe 63 (not shown in the figure) of the submarine cable 15 and are maintained airtight (watertight).

Further, on the trunk side, also the earth cable 54 passes through the center of the axis 59 and by the coupling resin 62. Terminal fittings 56 provided at the earth cable 54 are connected to an earth electrode 66, which is provided around the coupling resin 62 and contact the sea water.

Similarly, the part having a reference numeral 65 at a tip of the coupling resin 62 is a terminal for detaining the high-tensile steel line of the submarine cable 15. Synthetic rubber bellows 67 cover the axes 59 located between the opening of the branching joint ring 51 and the coupling resin 62 (on the branch side) and also between the main joint ring 53 and the coupling resin 62 (on the trunk side). The bellows 67 follow the gimbal joint 17 as it tilts and moves to protect a foreign matter from entering the movable portion.

Figure 2:
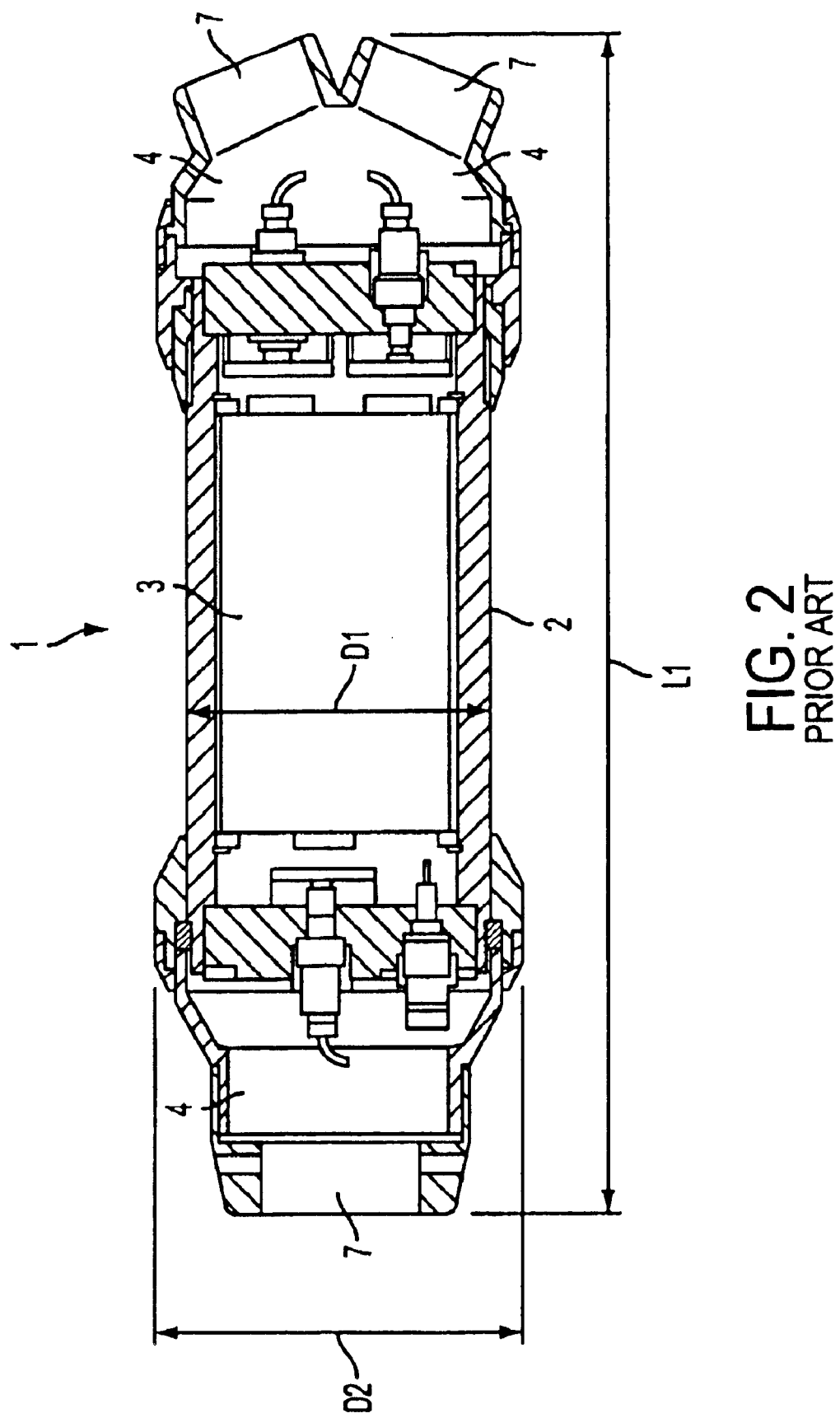
FIG. 2 is a sectional side view of the main body of the branching unit.
Figure 3:
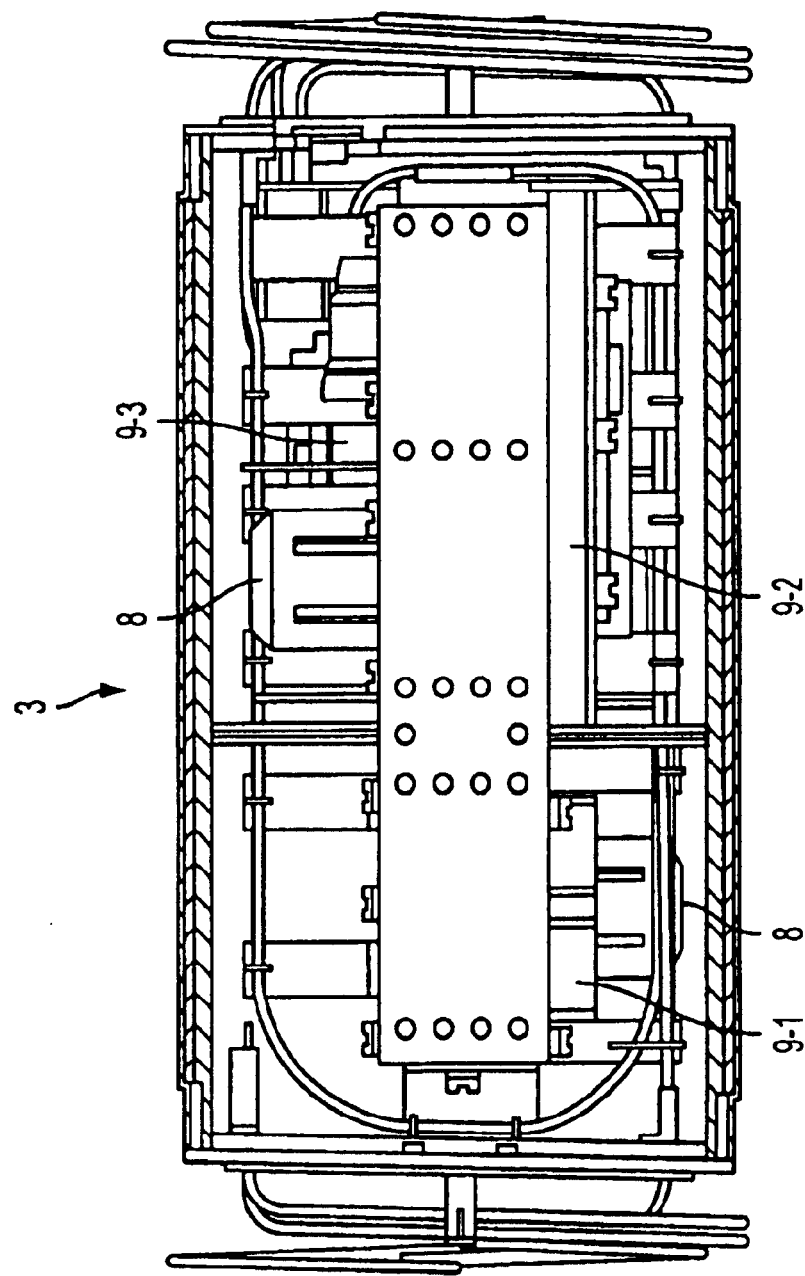
FIG. 3 is a side view of the inner unit.
Figure 4:
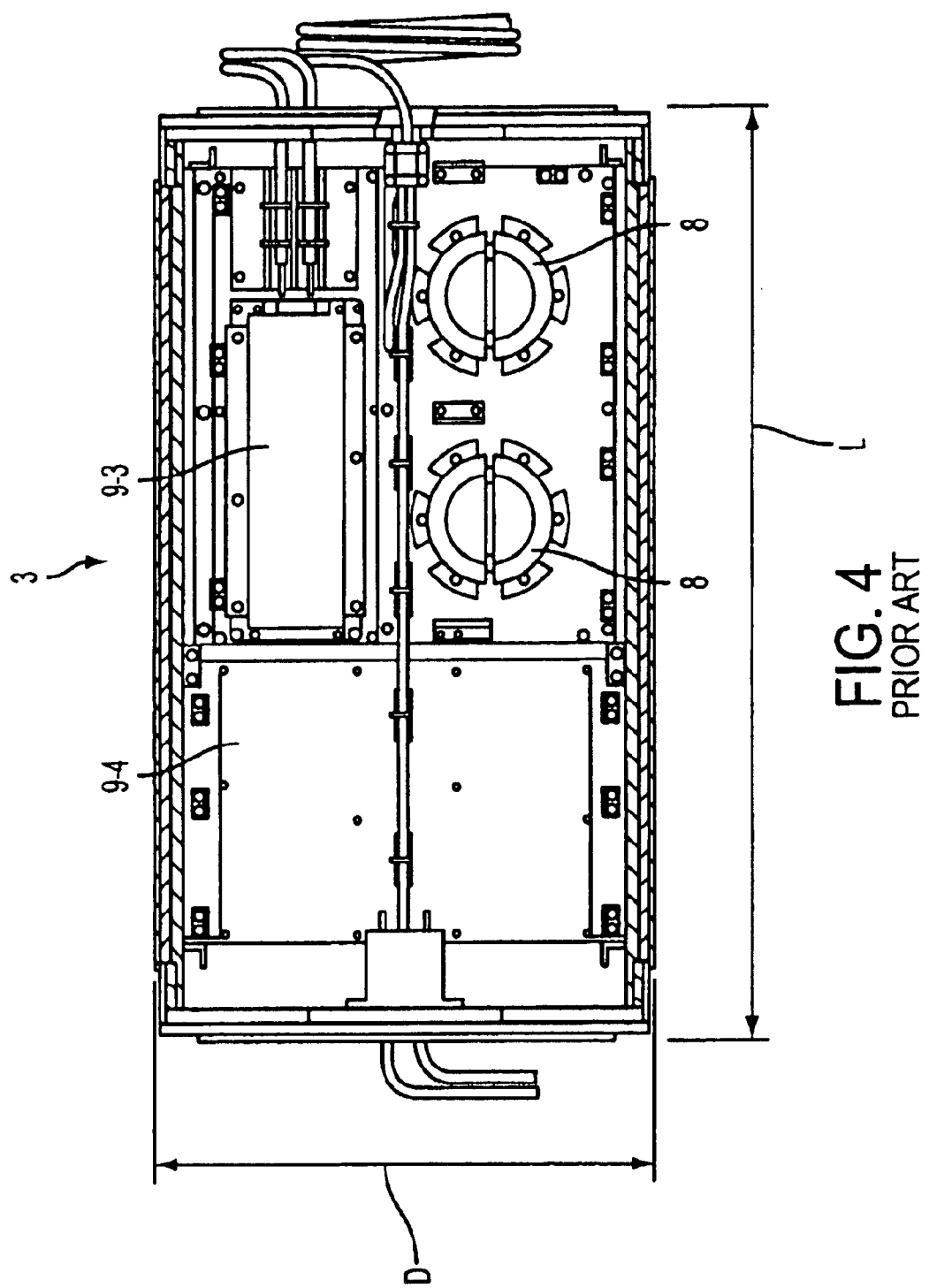
FIG. 4 is a top plan view of the inner unit as shown in FIG. 3.
Figure 5:
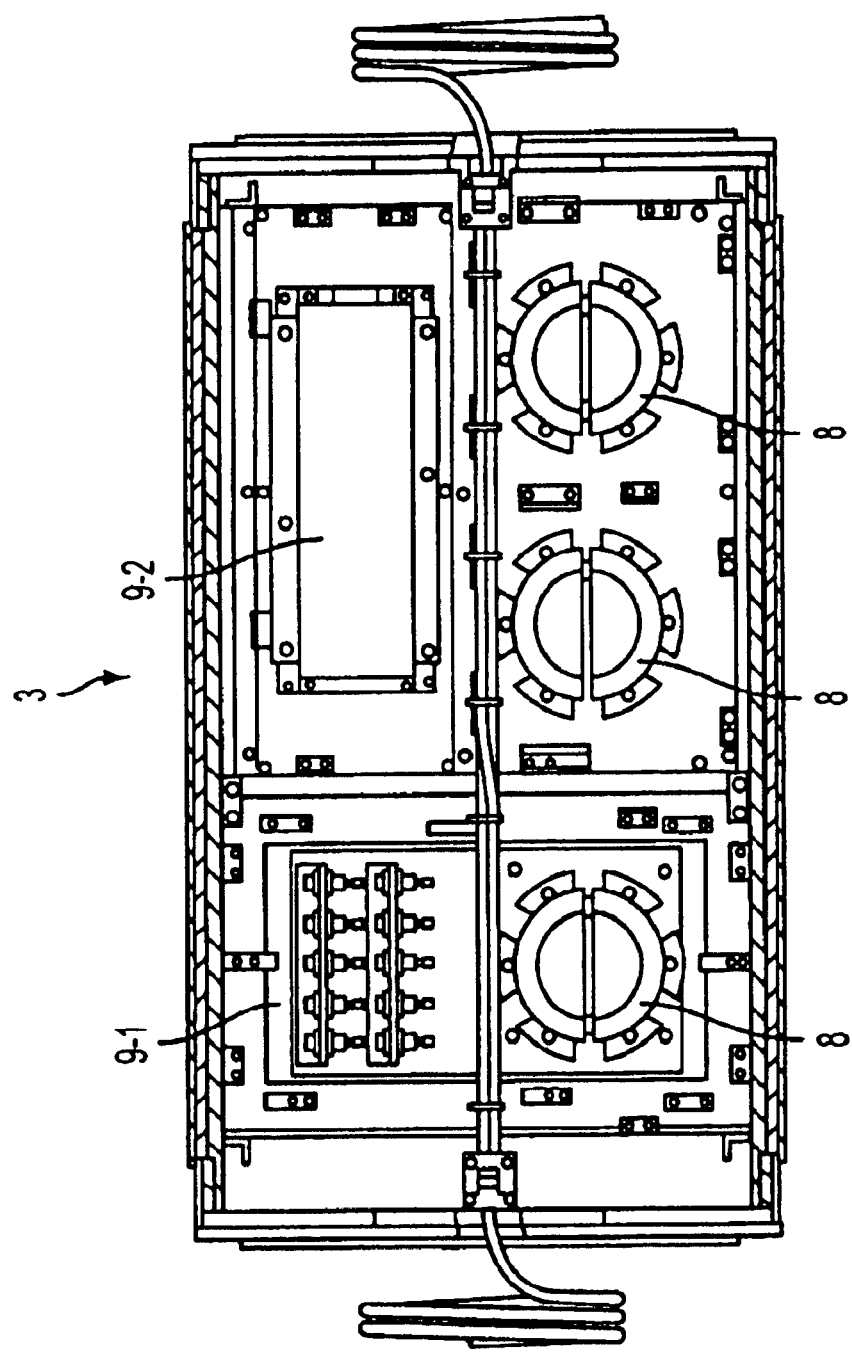
FIG. 5 is a bottom plan view of the inner unit as shown in FIG. 3.

With the thus-constructed submarine branch unit, the length L2 (see FIG. 6) between the tips of the cable terminations 16 is 3800 millimeters. The outside diameter D1 (see FIG. 7) of pressure-tight cylinder 12 is 250 millimeters. The length (L1) between the branching joint ring 51 and the main joint ring 53 is 1400 millimeters. The maximum width (D2) of the branching joint ring 51 is 480 millimeters. Thus, the present invention has significantly reduced the size of the branching unit compared with that shown in FIGS. 1 and 2 and also reduced the weight from conventional 8.5 kilo-newtons (see FIG. 2) to 3.8 kilo-newtons (see FIG. 7).

FIGS. 21A and 21B show the branching unit 11 of the present invention in relationship to a sheave equipped on a cable wiring ship. FIG. 21A is a side perspective view and FIG. 21B is a front view of the branching unit shown in FIG. 21A with the left and right of the center line of the branching unit body 49 shown as the horizon. The sheave 68 is shown in a circumference view. While the branching unit 11 is being laid in or drawn out of the sea, the branching unit 11 bends along the sheave 68 having a diameter of, e.g., 3 meters. Thus, the gimbal joints 17 allow the pressure-tight cylinder 12 of the branching unit body 49 and the cable terminations 16 (or coupling resins 62) to contact the sheave 68.

The angle θ between the center line CL1 of the branching unit body 49 and the center line CL2 of the cable termination 16 is 48.6 degrees for the shallow-sea submarine cable (SA cable) and 49.4 degrees for the deep-sea submarine cable (LW cable). A protection layer is provided for the SA cable to prevent the cable from damages caused by touching anchors and fishing implements, thus making the finished cable thick in outside diameter and accordingly, making the distance from the bending center of the gimbal joint 17 to the contact point larger. To the contrary, the LW cable without the protection layer is lighter in weight and thinner in diameter.

FIG. 22 shows a table comparing a conventional branching unit with that of the present invention.

As for the materials making the branching unit, the metal parts touching the sea water are made of beryllium copper alloy which is known as mechanically strong and highly corrosion-resistant. The present invention can make the branching unit small in size and light in weight. Besides, since the present invention can be make the gimbal joint 17 the same in shape and size as the submarine repeaters, the cable terminations 16 and related components can be used in common with the submarine repeaters. Since the circuit unit 24 can be mounted in contact with the circuit board 18, the heat generated from the circuit unit 24 can be effectively dissipated from the circuit board 18.

As is apparent from the above description, according to the present invention, the vacuum relays are all mounted on one side of the circuit board and are each covered with the insulator covers. Thus, the insulator covers each insulate securely the terminals and wirings of a vacuum relay from those of other relays and therefore, the vacuum relays can be arranged closely adjacent to each other, reducing the relay mounting area significantly.

Since the circuit units are all mounted on the other side of the circuit board and therefore, the heat generated from the circuits is conducted to the circuit board and dissipated effectively, the circuit board can be reduced in size. Since, on the outside of the pressure-tight cylinder cover, a pair of the pigtail cables are spiraled and engaged with each other in an interleaved and overlapped fashion, the space which the individual cables wound independently occupied conventionally was reduced significantly and thus, minimizing the size of the branching unit. Further, the present invention can have the branching unit in common in configuration with a submarine repeater and when laying/drawing the unit in/out of the sea, can use the same sheave as used for the submarine repeater.

What is claimed is:

1. A submarine branching unit comprising:
    a pressure-tight cylinder;
    a circuit board;
    a plurality of vacuum relays mounted on said circuit board, said vacuum relays each having terminals and wirings; and
    a plurality of insulator covers for covering said respective vacuum relays, terminals and wirings to insulate said vacuum relays from each other.

2. A submarine branching unit comprising:
    a pressure-tight cylinder;
    a circuit board;
    at least one circuit unit mounted on one side of said circuit board;
    a plurality of vacuum relays mounted on the other side of said circuit board, said vacuum relays each having terminals and wirings; and
    a plurality of insulator covers for covering said respective vacuum relays, terminals and wirings to insulate said vacuum relays from each other.

3. A submarine branching unit comprising:
    a pressure-tight cylinder; and
    a pair of cables extending out of an end of said pressure-tight cylinder, said cables each being spiraled and engaged with each other.

4. A submarine branching unit according to claim 3:
    wherein said cables are spiraled in opposite directions and engaged with each other.

5. A method of manufacturing a submarine branching unit including a pressure-tight cylinder, a circuit board, at least one circuit unit, a plurality of vacuum relays each having respective terminals and wirings and a plurality of insulator covers, said method comprising the steps of:
    mounting the circuit unit on one side of the circuit board;
    mounting the vacuum relays on the other side of the circuit board; and
    covering the vacuum relays, terminals and wirings with the respective insulator covers to insulate the vacuum relays from each other.

6. A method of manufacturing a submarine branching unit including a pressure-tight cylinder and a pair of cables extending out of an end of the pressure-tight cylinder, said method comprising the steps of:

spiraling each of the cables; and engaging the spiraled cables with each other.

7. A submarine branching unit in accordance with claim 3, said cables each being spiraled and engaged with each other in an interleaved and overlapping fashion.

8. A method in accordance with claim 6, wherein said spiraled cables are engaged with each other in an interleaved and overlapping fashion.

\* \* \* \* \*

UNITED STATES PATENT AND TRADEMARK OFFICE
CERTIFICATE OF CORRECTION

PATENT NO. : 6,809,934 B2  Page 1 of 1
APPLICATION NO. : 10/308431
DATED : October 26, 2004
INVENTOR(S) : T. Takeda and J. Nishida It is certified that error appears in the above-identified patent and that said Letters Patent is hereby corrected as shown below:

Title Page, Item (75) Inventors: should read

-- (75) Inventors: Taiichi Takeda, Yokohama (JP); Junko Nishida, Kawasaki (JP) --

Signed and Sealed this

Twenty-fourth Day of April, 2007

JON W. DUDAS
*Director of the United States Patent and Trademark Office*